United States Patent
Nomura et al.

(10) Patent No.: US 9,545,801 B2
(45) Date of Patent: Jan. 17, 2017

(54) PRINTING APPARATUS FOR MODIFYING THE PRINT TIMING OF RECORDING ELEMENT ARRAYS ACCORDING TO THE PERIMETER LENGTH OF A TIMING ROLLER

(71) Applicants: SCREEN Holdings Co., Ltd., Kyoto (JP); Ricoh Company, Ltd., Tokyo (JP)

(72) Inventors: Seiya Nomura, Kyoto (JP); Kazuki Yamanaka, Kyoto (JP); Osamu Morizono, Kyoto (JP); Kunio Muraji, Kyoto (JP)

(73) Assignees: SCREEN Holdings Co., Ltd. (JP); RICOH COMPANY, LTD. (JP)

( * ) Notice: Subject to any disclaimer, the term of this patent is extended or adjusted under 35 U.S.C. 154(b) by 0 days.

(21) Appl. No.: 14/816,104

(22) Filed: Aug. 3, 2015

(65) Prior Publication Data

US 2016/0078330 A1    Mar. 17, 2016

(30) Foreign Application Priority Data

Sep. 11, 2014    (JP) .................................. 2014-185524

(51) Int. Cl.
G06F 3/12    (2006.01)
B41J 15/00    (2006.01)
G06K 15/02    (2006.01)

(52) U.S. Cl.
CPC .............. B41J 15/00 (2013.01); G06K 15/022 (2013.01); G06K 15/1868 (2013.01)

(58) Field of Classification Search
CPC ........................... G06K 15/027; G06K 15/102
See application file for complete search history.

(56) References Cited

U.S. PATENT DOCUMENTS

| 7,434,904 B2* | 10/2008 | Tanaka ...................... B41J 3/28 347/14 |
| 2007/0126837 A1* | 6/2007 | Takahashi .............. B41J 11/007 347/104 |
| 2013/0328957 A1 | 12/2013 | Teshigawara et al. ......... 347/14 |
| 2014/0321890 A1* | 10/2014 | Hagiwara .......... G03G 15/0189 399/301 |

FOREIGN PATENT DOCUMENTS

JP    2013-252641    12/2013

* cited by examiner

*Primary Examiner* — Benjamin O Dulaney
(74) *Attorney, Agent, or Firm* — Ostrolenk Faber LLP (57) ABSTRACT

Provided is a printing method of performing printing onto a recording medium to be transported with a plurality of recording element arrays. The printing method includes a storing step of storing a perimeter of a timing roller upon acquiring correction data in association with the correction data, an obtaining step of obtaining the perimeter during printing after the storing step of storing the perimeter upon acquiring the correction data, and a modifying step of modifying the correction data during the printing in accordance with the perimeter upon acquiring the correction data and the perimeter during the printing.

16 Claims, 9 Drawing Sheets

PRINTING APPARATUS FOR MODIFYING THE PRINT TIMING OF RECORDING ELEMENT ARRAYS ACCORDING TO THE PERIMETER LENGTH OF A TIMING ROLLER

TECHNICAL FIELD

The present invention relates to a printing apparatus and a printing method for correcting printing timings.

BACKGROUND ART

Examples of currently-used apparatus of the above type include a recording device that records an image to a recording medium to be transported. The recording device includes a plurality of inkjet recording heads, a scanner, and a controller (disclosed, for example, in Japanese Patent Publication No. 2013-252641A).

The recording heads print an inspection pattern onto the recording medium. The scanner scans the inspection pattern. The controller calculates shift amounts of recording positions printed onto the recording medium by the recording heads in accordance with information scanned by the scanner, and provides adjustment data based on the shift amounts to the recording heads individually. The recording heads each change its printing timing with the adjustment data, whereby the recording positions of the recording heads are shifted in a transportation direction of the recording medium.

However, the example of the currently-used device with such a configuration possesses the following drawbacks. That is, the currently-used device has difficulty in efficiently monitoring a temporal variation in shift amount of the recording positions caused by operation of a printing apparatus. Monitoring the variation in shift amount requires constant and continuous printing of the inspection pattern by the recording heads as well as constant and continuous scanning of the inspection pattern by the scanner. Moreover, the currently-used device has difficulty in obtaining a real-time variation in shift amount correctly. A time lag occurs between generation of a shift and detection of the shift, the time lag having a longer time period than that during movement of the recording medium from below the recording heads to below the scanner. As a result, the currently-used device cannot adjust the printing timings of the recording heads correctly.

SUMMARY OF INVENTION

The present invention has been made regarding the state of the art noted above, and its one object is to provide a printing apparatus and a printing method that allow accurate correction of printing timings.

The present invention is constituted as stated below to achieve the above object. One embodiment of the present invention discloses a printing method of performing printing onto a recording medium to be transported with a plurality of recording element arrays. The printing method includes a storing step of storing a perimeter of a timing roller upon acquiring correction data in association with the correction data, the correction data being used for correcting printing timings of the recording element arrays; an obtaining step of obtaining the perimeter during printing after the storing step of storing the perimeter upon acquiring the correction data; and a modifying step of modifying the correction data during the printing in accordance with the perimeter upon acquiring the correction data and the perimeter during the printing.

Prior to printing, the perimeter of the timing roller upon acquiring the correction data is stored together with the correction data. Thereafter, a current perimeter of the timing roller (i.e., a perimeter of the timing roller during the printing) is obtained during the printing. Then, the correction data is modified during the printing in accordance with the perimeter upon acquiring the correction data and the perimeter during the printing. Using the modified correction data allows appropriate correction of the printing timings even when the perimeter of the timing roller is changed during the printing. As a result, the recording element arrays achieve printing onto the recording medium at appropriate printing timings. As noted above, the printing method according to the present embodiment allows appropriate correction of the printing timings by the recording element arrays. Consequently, shifting of printing positions of the recording element arrays is suitably avoidable.

Here, the "timing roller" is a rotation roller that rotates in association with transportation of the recording medium. That is, the "timing roller" is a roller whose rotation amount is a reference for the printing timings (strictly speaking, pre-correction printing timings).

In the present embodiment noted above, it is preferable that the modifying step of modifying correction data includes calculating a modification amount in accordance with a difference between the perimeter upon acquiring the correction data and the perimeter during the printing, and adding the correction data to the modification amount. Consequently, the correction data can be modified suitably in the modifying step of modifying the correction data.

In the present embodiment noted above, it is preferable that the method further includes a correcting step of correcting the printing timings in accordance with the modified correction data. This allows suitable correction of the printing timings.

In the present embodiment noted above, it is preferable that the correcting step of correcting the printing timing includes correcting printing positions of the recording element arrays relative to the recording medium in a transportation direction of the recording medium. The recording element arrays perform printing onto the recording medium to be transported. Accordingly, correcting the printing timings allows suitable correction of the printing positions of the recording element arrays in the transportation direction of the recording medium.

In the present embodiment noted above, it is preferable that the method further includes an acquiring step of acquiring the correction data in accordance with an inspection pattern printed onto the recording medium, and an obtaining step of obtaining the perimeter of the timing roller upon printing the inspection pattern onto the recording medium with the recording element arrays as the perimeter upon acquiring the correction data. This allows efficient acquisition of the correction data and efficient obtainment of the perimeter upon acquiring the correction data.

Another embodiment of the present invention discloses a printing apparatus. The printing apparatus includes a timing roller contacting a recording medium to be transported; a perimeter obtaining unit obtaining a perimeter of the timing roller; a storing unit storing correction data used for correcting printing timings and the perimeter upon acquiring the correction data in association with each other; a correction data modifying unit modifying the correction data associated with the perimeter into modified correction data in accordance with the perimeter during printing and the perimeter stored in the storing unit; and a plurality of recording element arrays performing printing onto the recording medium to be transported at corrected printing timings corrected with the modified correction data.

The printing apparatus according to the present embodiment includes the perimeter obtaining unit, thereby achieving suitable obtainment of the perimeter during the printing. The printing apparatus includes the storing unit, thereby achieving reference of the correction data and the perimeter upon acquiring the correction data appropriately. Moreover, the printing apparatus includes the correction data modifying unit, thereby achieving suitable modification of the correction data into the modified correction data in accordance with the perimeter upon obtaining the correction data and the perimeter during the printing. The recording element arrays perform printing onto the recording medium at the corrected printing timings. Accordingly, suitable correction of the printing timings of the recording element arrays is obtainable. That is, the printing apparatus according to the present embodiment allows suitable correction of the printing timings of the recording element arrays. Consequently, shifting of printing positions of the recording element arrays is suitably avoidable.

In the present embodiment noted above, the printing apparatus further includes a speed controller controlling a transportation speed of the recording medium to be transported, and a rotation amount detector detecting a rotation amount of the timing roller. The perimeter obtaining unit obtains the perimeter of the timing roller in accordance with the transportation speed and the rotation amount. Such is preferable. The printing apparatus includes the speed controller and the rotation amount detector. Accordingly, the perimeter obtaining unit allows suitable obtainment of the transportation speed and the rotation amount. Consequently, the perimeter obtaining unit can obtain the perimeter of the timing roller accurately in real time.

In the present embodiment noted above, it is preferable that the printing apparatus further includes a printing timing corrector correcting the printing timings with the modified correction data, and causing the recording element arrays to perform printing at corrected printing timings. The printing apparatus includes the printing timing corrector, thereby allowing suitable correction of the printing timings.

In the present embodiment noted above, it is preferable that the printing timing corrector corrects the printing timings determined from the rotation amount of the timing roller using the modified correction data. The printing timings determined from the current rotation amount of the timing roller are to be corrected. The modified correction data determined from the current perimeter of the timing roller is a correction amount. Consequently, suitable correction of the printing timings to be corrected is performable.

In the present embodiment noted above, it is preferable that the printing timing corrector corrects printing positions of the recording element arrays relative to the recording medium in the transportation direction of the recording medium. The recording element arrays perform printing onto the recording medium to be transported. Consequently, correcting the printing timings allows the printing positions of the recording element arrays to be corrected suitably in the transportation direction of the recording medium.

In the present embodiment noted above, it is preferable that the correction data is set for the recording element arrays individually. This allows correction of the printing timings for the recording element arrays individually.

In the present embodiment noted above, it is preferable that the recording element arrays are inkjet recording element arrays discharging ink droplets. This achieves an inkjet printing method and an inkjet printing apparatus that allow suitable prevention of shifting of the printing positions.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

DESCRIPTION OF EMBODIMENTS

Figure 1:
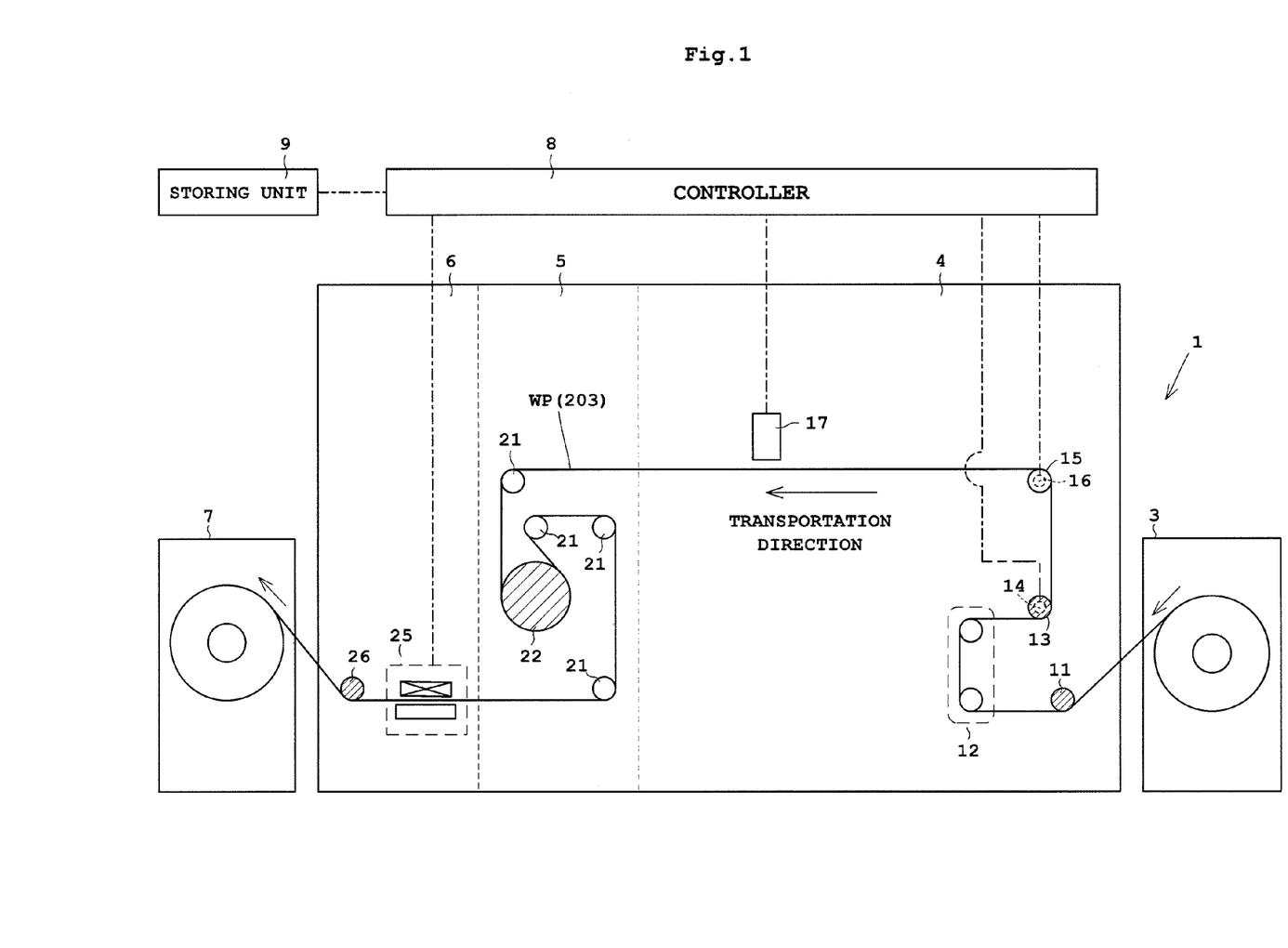
FIG. 1 is a schematic view of an inkjet printing apparatus according to one embodiment of the present invention.

The following describes preferred embodiments of the present invention in detail with reference to drawings. FIG. 1 schematically illustrates an inkjet printing apparatus according to one embodiment of the present invention.

An inkjet printing apparatus 1 (hereinafter, referred to as a "printing apparatus 1" where appropriate) performs printing onto long web paper WP. The printing apparatus 1 includes a paper feeder 3, a print unit 4, a drying unit 5, an inspecting unit 6, and a take-up roller 7. The paper feeder 3 rotatably holds and feeds the web paper WP in a roll form. A numeral 203 denotes a transportation path of the web paper WP. As illustrated in the drawing, the web paper WP is transported to the print unit 4, the drying unit 5, the inspecting unit 6, and the take-up roller 7, in this order. The print unit 4 performs printing onto the web paper WP. The drying unit 5 dries the web paper WP. The inspecting unit 6 inspects a printing quality. The take-up roller 7 winds the web paper WP.

The print unit 4 includes a drive roller 11, an edge position controller 12, a drive roller 13, a timing roller 15, and a recording unit 17, in this order, from upstream of the web paper WP. The drive roller 11 is rotatably driven by a motor, not shown, to draw the web paper WP from the paper feeder 3. The edge position controller 12 adjusts a position of the web paper WP so as for the web paper WP not to serpentine. The drive roller 13 is rotatably driven by a motor 14 to feed the web paper WP to the recording unit 17. Here, the timing roller 15 is a driven roller. That is, the timing roller 15 is freely rotatable, and rotates in association with transportation of the web paper WP. The recording unit 17 is of an inkjet type and discharges ink droplets.

An encoder 16 detects a rotation amount of the timing roller 15. The encoder 16 is, for example, an incremental rotary encoder. Moreover, the encoder 16 is one example of the rotation amount detector in the present invention.

Figure 2:
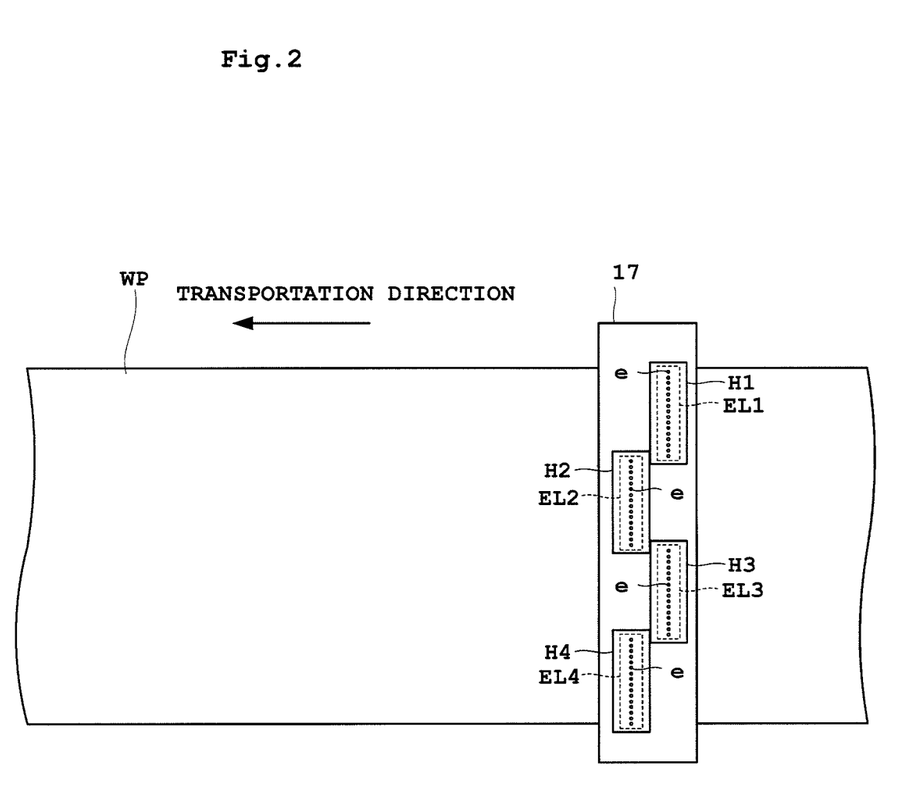
FIG. 2 is a plan view of a recording unit according to the embodiment.

Reference is made to FIG. 2. The recording unit 17 includes a plurality of recording heads H1 to H4. The recording heads H1 to H4 are disposed in a staggered manner from a first edge side to a second edge side of the web paper WP opposite to the first edge side. The recording heads H1 to H4 include recording element arrays EL1 to EL4, respectively. The recording element arrays EL1 to EL4 are each a group of recording elements e that are disposed in line in a direction orthogonal to a transportation direction of the web paper WP. The recording elements e each have an outlet through which the ink droplets are discharged to the web paper WP. In other words, the recording elements e are inkjet recording elements. The recording element arrays EL1 to EL4 are inkjet recording element arrays each discharging the ink droplets. During printing, the recording heads H1 to H4 and the recording element array EL1 to EL4 never move by themselves, but only the web paper WP moves. Hereinunder, the recording heads H1 to H4 are simply referred to as "recording heads H" if the heads are not particularly distinguished from one another. Similarly, the recording element arrays EL1 to EL4 are simply referred to as "recording element arrays EL" if the arrays are not particularly distinguished from one another. The number of recording heads H is not necessarily four, and the numbers of recording element arrays EL and recording elements e are not necessarily the number in the drawing.

The drying unit 5 is provided with a plurality of driven rollers 21 and a heat drum 22. The heat drum 22 has a heater embedded therein. The heat drum 22 is rotatably driven by a motor, not shown.

The inspecting unit 6 includes a scanner 25, and a drive roller 26 disposed in this order from the upstream. The scanner 25 scans the web paper WP. The drive roller 26 is rotatably driven by a motor, not shown.

The printing apparatus 1 further includes a controller 8, and a storing unit 9.

The controller 8 controls en bloc the units of the printing apparatus 1. For instance, the controller 8 performs control to operate the drive rollers 11, 13, 26, the heat drum 22, and the scanner 25. Consequently, the controller 8 controls transportation, printing, drying, and inspection of the web paper WP. The controller 8 is formed by a central processing unit (CPU), an FPGA (field-programmable gate array), a memory, and the like.

The storing unit 9 stores information generated by the controller 8 and information to which the controller 8 is referred.

Figure 3:
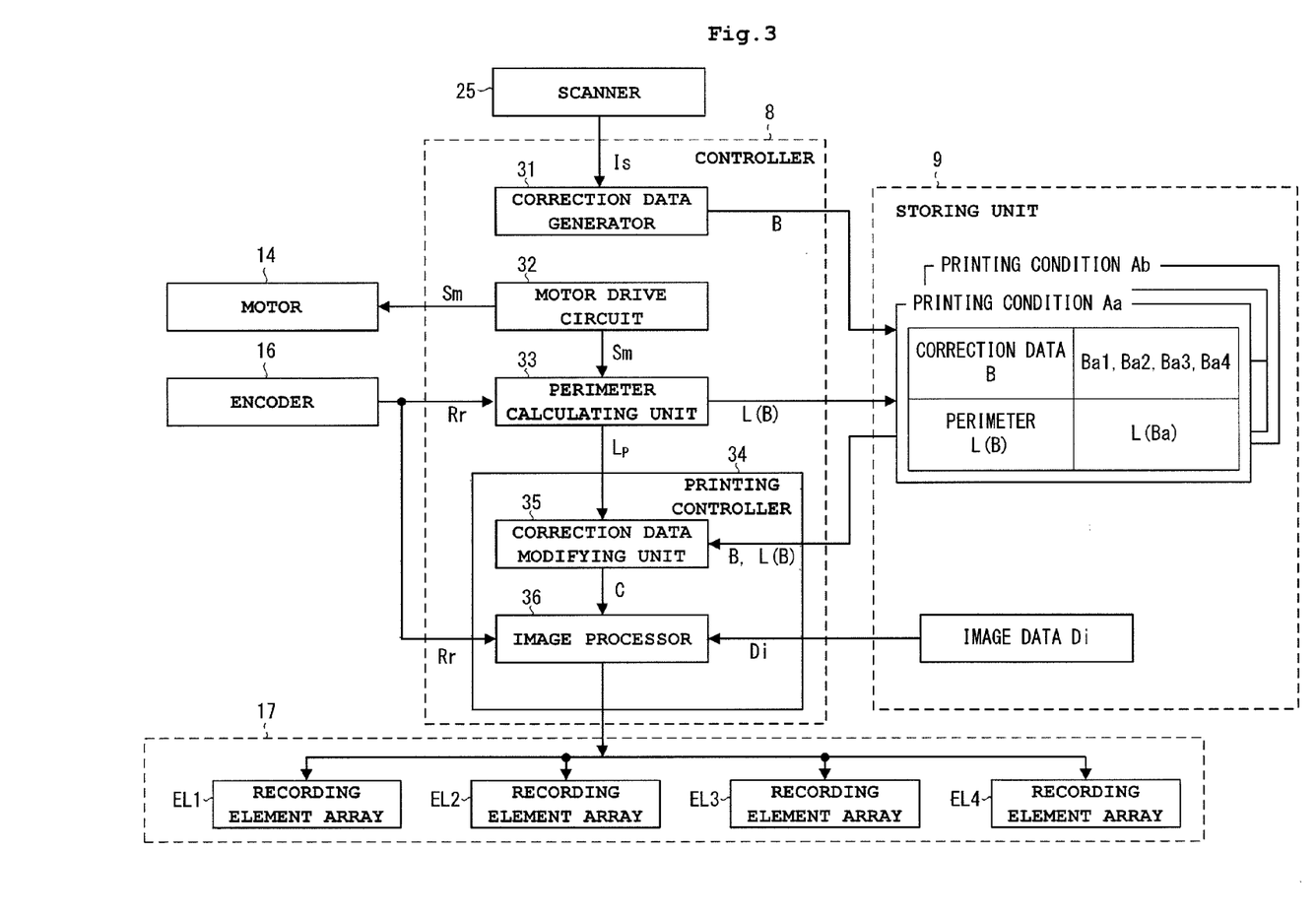
FIG. 3 is a block diagram of a controller and a storing unit according to the embodiment.

Reference is made to FIG. 3. The storing unit 9 stores correction data B and a perimeter L(B) in association with each other. It is preferable that database of the correction data B and the perimeter L(B) associated with each other is compiled for printing conditions Aa, Ab individually. The printing conditions Aa, Ab differ from each other depending on, for example, types or the transportation speed of the web paper WP.

The correction data B is used for correcting the printing timing of the recording element array EL. The correction data B is set for the recording element arrays EL individually. For instance, the correction data B in the printing condition Aa contains correction data Ba1 to Ba4 used for correcting printing timings of the recording element arrays EL1 to EL4, respectively.

Figure 4:
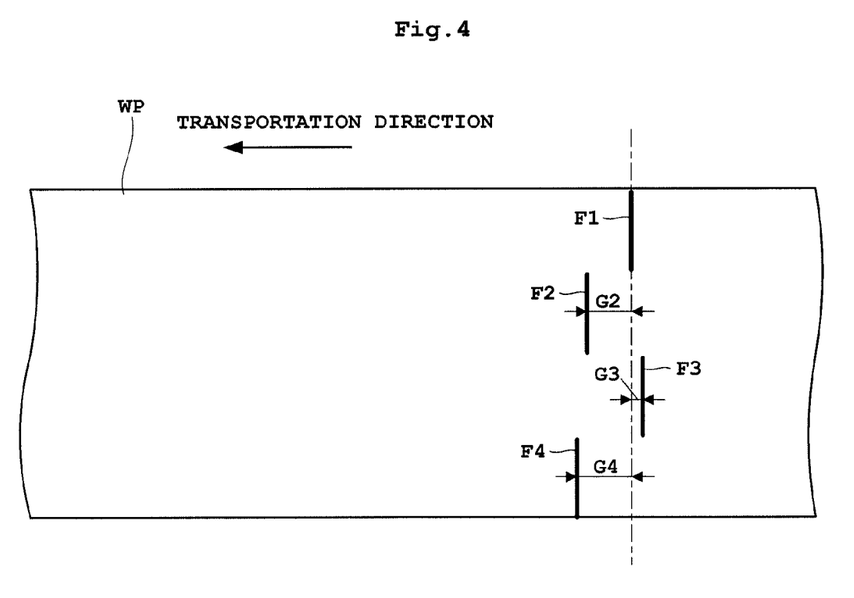
FIG. 4 illustrates an inspection pattern printed onto web paper.

Reference is made to FIG. 4. FIG. 4 illustrates an inspection pattern (chart) printed on the web paper WP. The inspection pattern contains lines F1 to F4 extending in the direction orthogonal to the transportation direction. The lines F1 to F4 are printed by the recording element arrays EL1 to EL4, respectively, and represent printing positions where the recording element arrays EL1 to EL4 prints onto the web paper WP, respectively. Ideally, it is preferable that the lines F1 to F4 are printed on the same line (e.g., denoted by dashed-dotted lines in FIG. 4). However, in actual, the lines F1 to F4 shift in the transportation direction of the Web paper WP as illustrated in the drawing. Such a shift of the printing positions of the recording element arrays EL1 to EL4 is referred to as a "step shift". Here, shift amounts G2 to 04 are each a distance [μm] between the line F1 and the lines F2 to F4, respectively, in the transportation direction. A step shift between the lines F1 and F3 is caused by a structural factor of the recording unit 17. Examples of the structural factor of the recording unit 17 include an assemble error of the recording heads H, and a variation in angle or speed of the ink droplets discharged from the recording element arrays EL.

The correction data B is determined to have a plurality of values used for offsetting the step shift of the recording element arrays EL appearing in the inspection pattern individually (more specifically, values used for minimizing the shift amounts G2 to G4 individually). For instance, with respect to a printing timing of the recording element array EL1, the correction data B1 for the recording element array EL1 has a value of zero. The correction data B2 to B4 for the recording element arrays EL2 to EL4, respectively, each have a value in response to the shift amount G2 to G4, respectively. The correction data B is, for example, a distance [μm] by which the printing position is shifted in the transportation direction of the web paper WP.

The perimeter L(B) is a circumference length of the timing roller 15 upon acquiring the correction data B. For instance, a perimeter L(Ba) under the printing condition Aa corresponds to a perimeter of the timing roller 15 upon acquiring the correction data Ba1 to Ba4.

The controller 8 includes a correction data generator 31, a motor drive circuit 32, a perimeter obtaining unit 33, and a printing controller 34.

The correction data generator 31 receives an image Is scanned by the scanner 25. The correction data generator 31 generates the correction data B in accordance with the image Is having the scanned inspection pattern.

The motor drive circuit 32 gives a pulse signal Sm to the motor 14 for controlling a driving amount of the motor 14. This causes the motor drive circuit 32 to control a rotation amount of the drive roller 13, i.e., a transportation speed $V_{WP}$ of the web paper WP. The motor drive circuit 32 is one example of the speed controller in the present invention.

The perimeter obtaining unit 33 obtains the transportation speed $V_{WP}$ of the web paper WP in accordance with the pulse signal Sm from the motor drive circuit 32. The perimeter obtaining unit 33 also obtains a cycle J of the timing roller 15 in accordance with an output Rr from the encoder 16. At this time, the perimeter obtaining unit 33 uses a pulse signal in a Z-phase in the output Rr from the encoder 16, thereby obtaining the cycle J with ease. That is because the pulse signal in the Z-phase is outputted one time every one rotation of the timing roller 15. The outputted Rr, the pulse signal in the Z-phase, and the cycle J are one example of the rotation amount of the timing roller in the present invention.

The perimeter obtaining unit 33 also obtains a perimeter L of the timing roller 15 in accordance with the transportation speed $V_{WP}$ of the web paper WP and the cycle J of the timing roller 15.

$$L = V_{WP} \cdot J \quad (1)$$

Note that the simple term "perimeter L" is not limited to the perimeter L(B) upon acquiring the correction data B, but generally means the perimeter L.

The printing controller 34 includes a correction data modifying unit 35 and an image processor 36.

The correction data modifying unit 35 reads out the correction data B and the perimeter L(B) upon obtaining the correction data B from the storing unit 9. The correction data modifying unit 35 obtains the current perimeter Lp from the perimeter obtaining unit 33. Then the correction data modifying unit 35 generates modified correction data C in accordance with the correction data B, the perimeter L(B), and the perimeter Lp.

Specifically, a difference ΔL between the perimeter L(B) and the perimeter Lp is calculated.

$$\Delta L = Lp - L(B) \quad (2)$$

Then, a modification amount (=ΔL·K) in response to the difference ΔL is added to the correction data B.

$$C1 = B1 + \Delta L \cdot k \quad (3)$$

$$C2 = B2 + \Delta L \cdot k \quad (4)$$

$$C3 = B3 + \Delta L \cdot k \quad (5)$$

$$C4 = B4 + \Delta L \cdot k \quad (6)$$

where B1 to B4 denote correction data B set for the recording element arrays EL1 to EL4, respectively. Moreover, C1 to C4 denote modified correction data C set for the recording element arrays EL1 to EL4, respectively. Moreover, k denotes a coefficient determined in advance through experiments. The difference ΔL and the modification amount may each have a negative value.

Figure 5A:
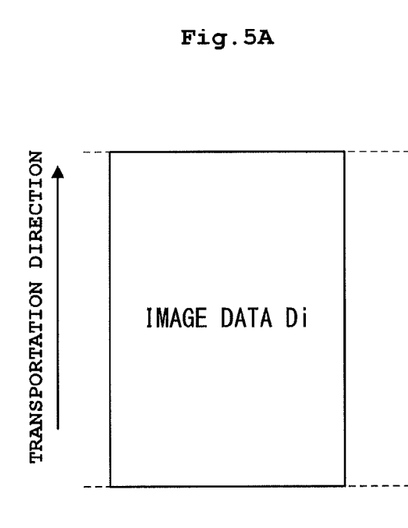
FIGS. 5A and 5B schematically illustrate image data and print data, respectively.
Figure 5B:
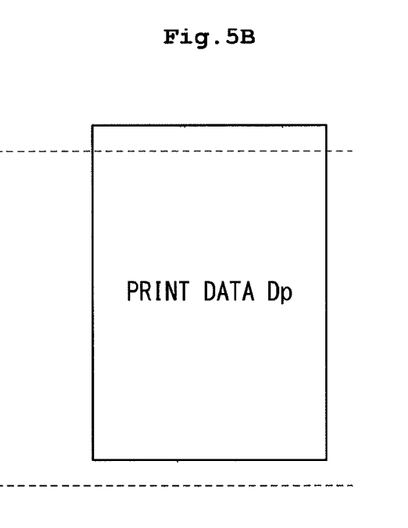

The image processor 36 generates print data Dp in accordance with the image data Di and the modified correction data C. As illustrated in FIGS. 5A, 5B, the print data Dp is obtained by shifting the image data Di in the transportation direction of the web paper WP by a distance corresponding to the modification amount.

Here, shifting the image data Di in the transportation direction is identical to changing (shifting) printing timings of the recording element arrays EL. As a result, the printing positions of the recording element arrays EL are changed (shifted) in the transportation direction.

The image processor 36 controls the recording element arrays EL in accordance with the output Rr from the encoder 16 and the print data Dp. Specifically, the image processor 36 corrects the printing timings with respect to the output Rr from the encoder 16 using the print data Dp. Such a process is identical to that of correcting the printing timings defined by the output Rr from the encoder 16 using the modified correction data C. Then, the image processor 36 causes the recording element arrays EL to discharge ink droplets at corrected printing timings. The image processor 36 is one example of the printing timing corrector in the present invention.

The following describes operation of the printing apparatus 1. Firstly, operation of storing the correction data B and the perimeter L(B) is to be described with reference to FIG. 6.

Figure 6:
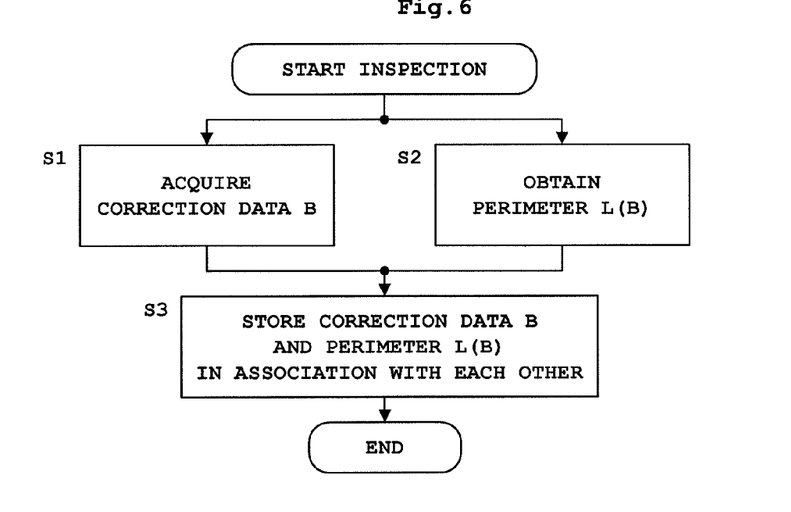
FIG. 6 is a flow chart illustrating an example of storing correction data and a perimeter.

Under control by the controller 8, the recording unit 17 prints the inspection pattern on the web paper WP, and the scanner 25 scans the printed inspection pattern. The correction data generator 31 generates correction data B in accordance with the image Is in the inspection pattern (step S1). When the recording unit 17 prints the inspection pattern, the perimeter obtaining unit 33 obtains the perimeter L(B) in accordance with the pulse signal Sm from the motor drive circuit 32 and the output Rr from the encoder 16 (step S2). The storing unit 9 stores the correction data B and the perimeter L(B) in association with each other (step S3).

Figure 7:
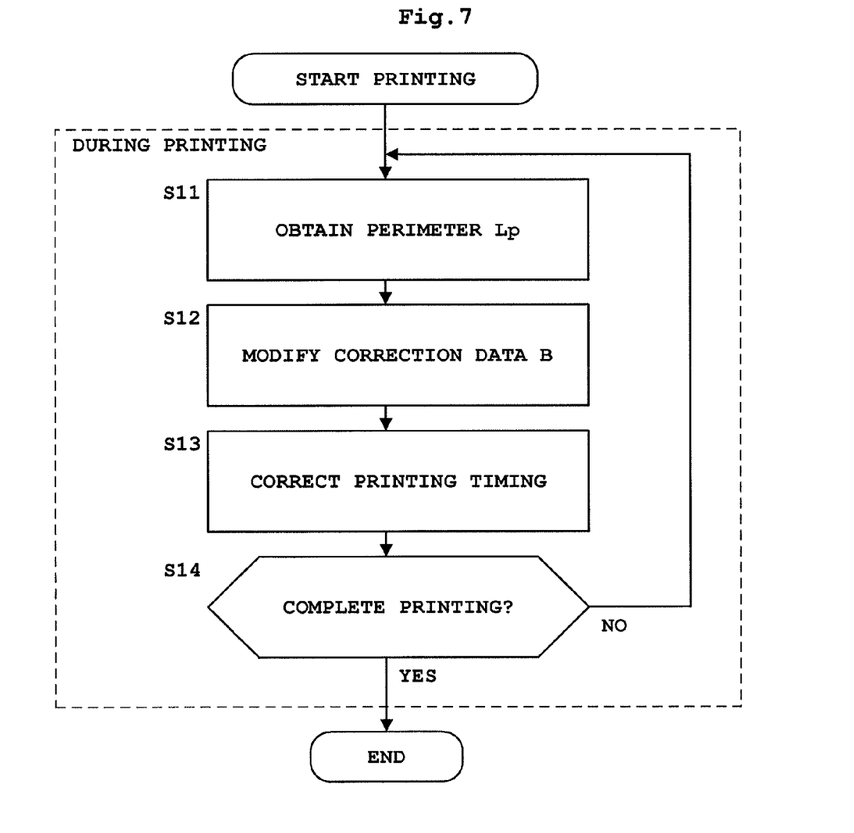
FIG. 7 is a flow chart of a printing process.

The following describes printing with reference to FIG. 7. The printing is performed after the correction data 13 and the perimeter L(B) are stored.

If printing starts, the perimeter obtaining unit 33 obtains the current perimeter Lp in accordance with the pulse signal Sm from the motor drive circuit 32 and the output Rr from the encoder 16 (step S11). Here, the current perimeter Lp is a perimeter Lp during the printing.

Figure 8:
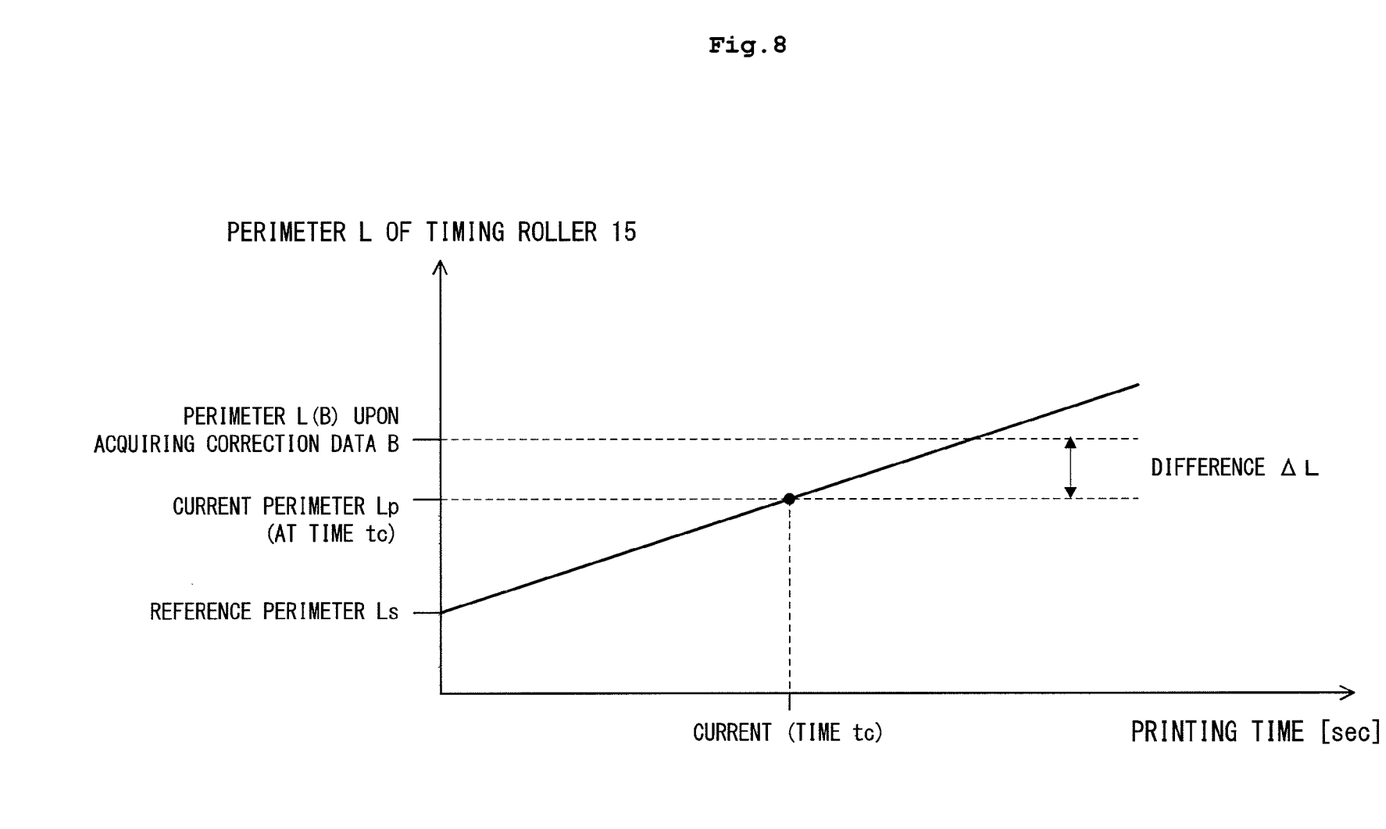
FIG. 8 is a graph illustrating a relationship between a printing time and the perimeter.

Reference is made to FIG. 8. FIG. 8 is a graph illustrating a relationship between a printing time and the perimeter L. As illustrated, the timing roller 15 thermally expands as the result of a temporal variation caused by operation of the printing apparatus 1 as the printing time becomes longer, whereby the perimeter L becomes longer. FIG. 8 indicates a reference perimeter Ls as the perimeter prior to thermal expansion for reference.

The correction data modifying unit 35 identifies a printing condition A same as that during the printing while referring to the storing unit 9, and identifies the correction data B and the perimeter L(B) under the printing condition A. The correction data modifying unit 35 obtains the perimeter Lp during the printing from the perimeter obtaining unit 33. The correction data modifying unit 35 modifies the correction data B in accordance with the perimeter L(B) and the perimeter Lp (step S12). From the modification, the modified correction data C is obtainable. The image processor 36 converts the image data Di into print data Dp in accordance with the modified correction data C. That is, the image processor 36 corrects printing timings with the modified correction data C (step S13). Then the image processor 36 controls the recording element arrays EL in accordance with the output Rr from the encoder 16 and the print data Dp. Accordingly, the recording element arrays EL discharge ink droplets at the printing timings corrected with the modified correction data C.

The controller 8 repeats the steps S11 to S13 during the printing to generate modified correction data C (step S14). Then the controller 8 constantly corrects the printing timings using the updated modified correction data C. If the printing is completed, generation of the modified correction data C through the steps S11 to S13 is completed (step S14).

As noted above, with the present embodiment, the storing unit 9 stores the correction data B and the perimeter L(B) prior to printing, whereby the controller 8 can refer to the correction data B and the perimeter L(B). Moreover, during the printing, the perimeter obtaining unit 33 obtains the perimeter Lp in real time. Consequently, even when the timing roller 15 thermally expands, a variation in shift amount of the recording positions can be monitored accurately and efficiently. Moreover, during the printing, the correction data modifying unit 35 modifies the correction data B in accordance with the perimeters L(B) and Lp. The printing timings are correctable during the printing with the correction data B modified in this manner (i.e., the modified correction data C). As a result, the step shifts for the recording element arrays EL are avoidable rapidly.

Since the perimeter L(B) corresponds to a perimeter upon acquiring the correction data B, the correction data modifying unit 35 can modify the correction data B accurately. This allows accurate prevention of the step shifts for the recording element arrays EL.

In this regard, the perimeter L(B) upon acquiring the correction data B does not always conform to the reference perimeter Ls as illustrated in FIG. 8. Consequently, using the reference perimeter Ls instead of the perimeter L(B) fails to correct the correction data B accurately.

Moreover, since the perimeter L(B) upon acquiring the correction data B is not necessarily the reference perimeter Ls, the correction data B is acquirable any time regardless of a condition of the timing roller 15. For instance, as illustrated in FIG. 8, the correction data B is readily acquirable even when the perimeter L(B) is longer than the reference perimeter Ls.

Moreover, the controller 8 corrects the printing timings constantly using the updated modified correction data C. This allows accurate and constant correction of the printing timings.

The correction data modifying unit 35 calculates the modification amount ($=\Delta L \cdot K$) in accordance with the difference $\Delta L$ between the perimeter L(B) and the perimeter Lp, and adds the modification amount to the correction data B. Such a process allows suitable modification of the correction data B.

The correction data B is acquired in accordance with the inspection pattern printed on the web paper WP (step S1). Moreover, the perimeter L(B) is obtained while the recording unit 17 prints the inspection pattern onto the web paper WP (step S2). Consequently, the correction data B and the perimeter L(B) are efficiently obtainable.

The perimeter obtaining unit 33 obtains the perimeter L of the timing roller 15 in accordance with the transportation speed $V_{WP}$ and the cycle J. Consequently, the perimeter L is obtainable accurately in real time.

The printing apparatus 1 includes the image processor 36, whereby the printing timings are suitably correctable with the modified correction data C.

Then the image processor 36 corrects the printing timings determined by the output Rr from the encoder 16 using the modified correction data C. That is, the printing timings determined with respect to the rotation amount of the timing roller 15 during the printing are to be corrected. Accordingly, the modified correction data C having the considered perimeter Lp during the printing contained therein causes accurate correction of the printing timings to be corrected.

The correction data B is set for the recording element arrays EL individually. Moreover, the modified correction data C is acquired for the recording element arrays EL individually. Consequently, the printing timings are suitably correctable for the recording element arrays EL individually.

The present invention is not limited to the foregoing embodiment, but may be modified as follows.

Figure 9:
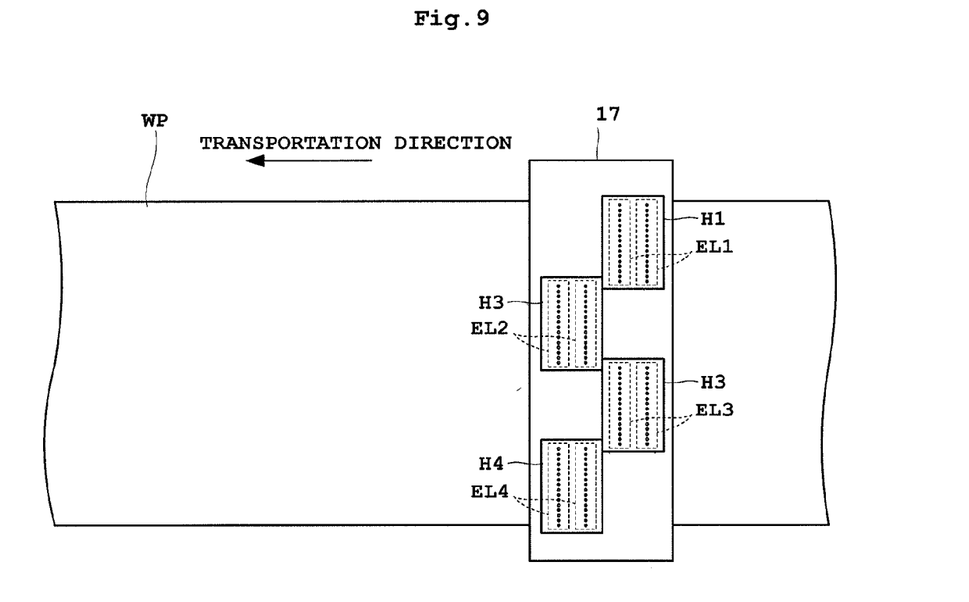
FIGS. 9 to 11 each illustrate a plan view of a recording unit according to one modification of the present invention.

(1) In the present embodiment, the recording heads H each include one recording element array EL. However, this is not limitative. For instance, as illustrated in FIG. 9, the recording heads H each include two recording element arrays EL. In this modification, the correction data B may be set for each of the recording element arrays EL. Alternatively, the correction data B may be set for each of the recording heads H.

Figure 10:
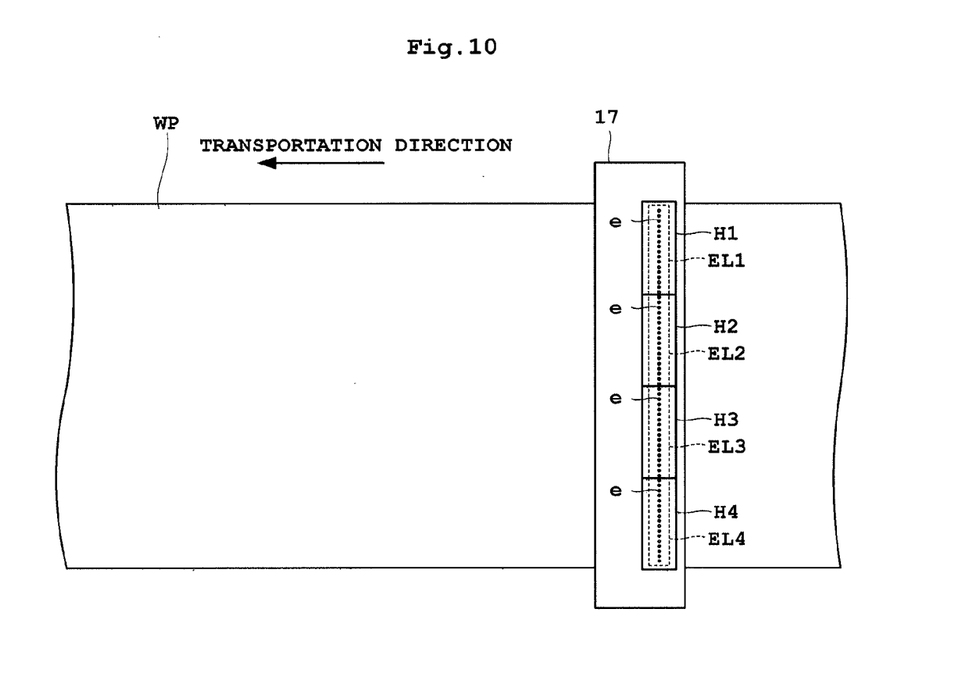

(2) In the present embodiment, the recording heads H1 to H4 are arranged in a staggered manner. However, this is not limitative. For instance, as illustrated in FIG. 10, the recording heads H may be disposed in line in a direction orthogonal to the transportation direction of the web paper WP.

(3) In the present embodiment, the print unit 4 includes one recording unit 17. However, this is not limitative. For instance, a plurality of recording units 17 may be provided. In this case, the recording units 17 may discharge ink droplets in different colors individually.

Figure 11:
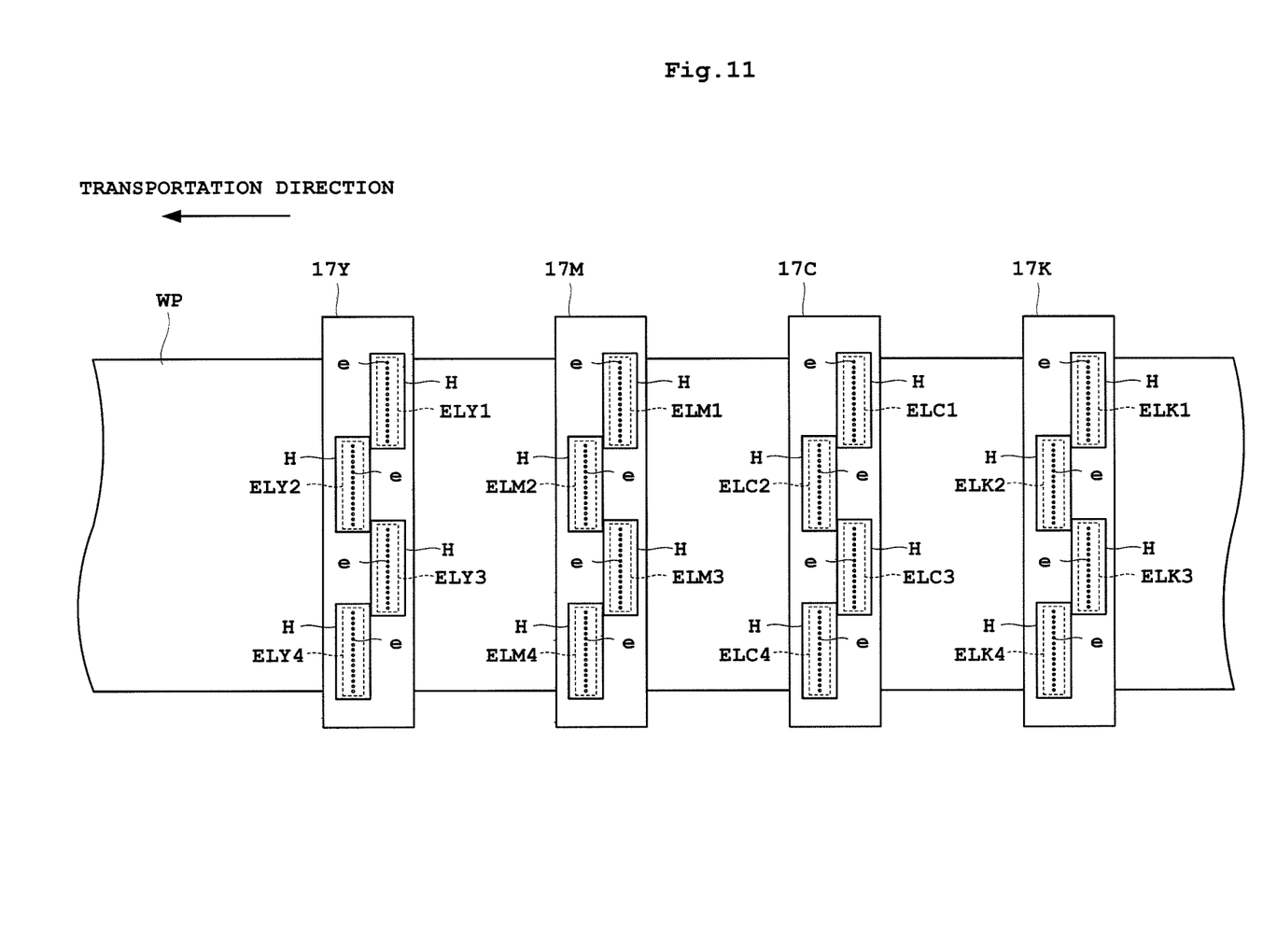
Figure 12A:
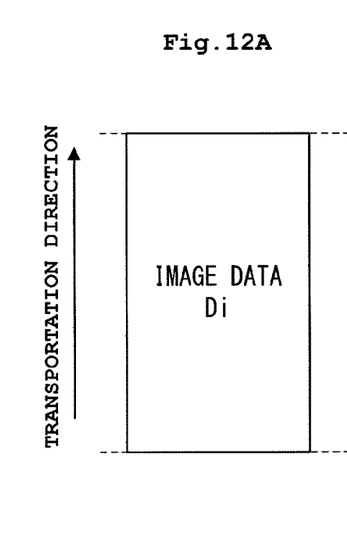
FIGS. 12A to 12E schematically illustrate image data and print data.
Figure 12B:
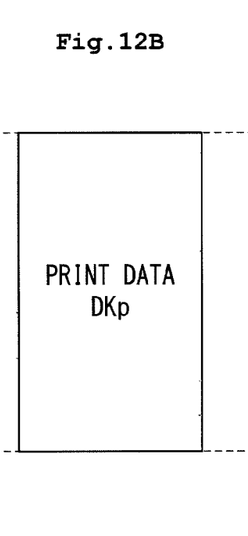
Figure 12C:
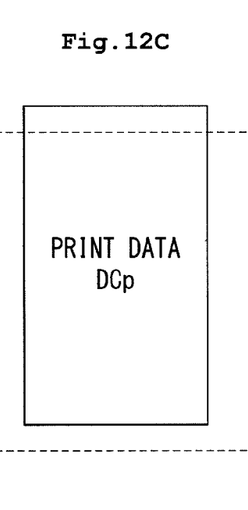
Figure 12D:
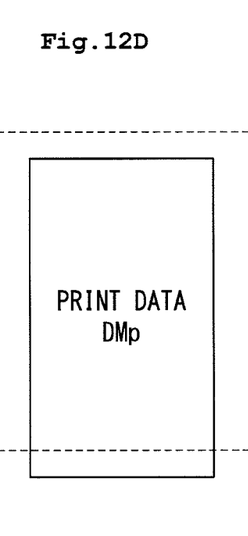
Figure 12E:
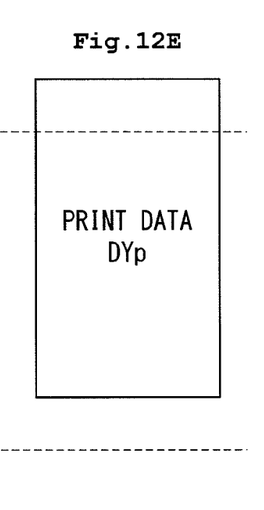

Reference is now made to FIG. 11. The print unit 4 includes a plurality of recording units 17K, 17C, 17M, 17Y. The recording units 17K, 17C, 17M, 17Y are disposed at given intervals in the transportation direction of the web paper WP. The recording units 17K, 17C, 17M, 17Y are for black, cyan, magenta, and yellow, respectively. The recording unit 17K includes recording element arrays ELKi (i denotes an integer of one to four). Similarly, the recording units 17C, 17M, 17Y include recording element arrays ELCi, ELMi, ELYi, respectively.

In this modification, correction data B contains correction data BKi, BCi, BMi, BYi in response to the recording element arrays ELKi, ELCi, ELMi, ELYi, respectively. Moreover, modified correction data C contains modified correction data CKi, CCi, CMi, CYi in response to the correction data BKi, BCi, BMi, BYi, respectively.

The following describes a relationship between the correction data B and the modified correction data C.

$$\Delta L = Lp - L(B) \tag{2}$$

$$Cki = Bki + \Delta L \cdot kK \tag{7}$$

$$CCi = BCi + \Delta L \cdot kC \tag{8}$$

$$CMi = BMi + \Delta L \cdot kM \tag{9}$$

$$CYi = BYi + \Delta L \cdot kY \tag{10}$$

where kK, kC, kM, kY each denote a coefficient, and are determined in advance through experiments.

The image processor 36 generates four pieces of print data DKp, DCp, DMp, DYp from the image data Di. Specifically, the image processor 36 generates the print data DKp in accordance with the image data Di and the modified correction data CKi. Other pieces of print data DCp, DMp, DYp are generated in the same manner. As illustrated in FIGS. 12A to 12E, the print data DKp, DCp, DMp, DYp is obtained by offsetting the image data Di in the transportation direction of the web paper WP.

The image processor 36 controls the recording element arrays ELKi in accordance with the print data DKp. Similarly, the image processor 36 controls the recording element arrays ELCi, ELMi, ELYi in accordance with the print data DCp, DMp, DYp, respectively.

The present modification allows prevention of a step shift among the printing positions in the same color and a step shift among the printing positions in different colors. The former step shift corresponds to shifts between the printing position of the recording element array ELK1 and the printing positions of the recording element arrays ELK2 to ELK4. The latter step shift corresponds to shifts between the printing position of the recording element array ELK1 and the printing positions of the recording elements ELC1 to ELC4, ELM1 to ELM4, and ELY1 to ELY4.

(4) In the present embodiment, colors of the ink droplets discharged from the recording element arrays EL1 to EL4 are not particularly described, but are selectable appropriately.

(5) In the present embodiment, the distance [μm] has been described as one example of a unit of the correction data B. However, this is not limitative. The correction data B may be the number of dots [−] for shifting the printing positions in the transportation direction of the web paper WP. Alternatively, the correction data B may be time [msec] for moving the printing timing ahead/behind temporally.

(6) In the present embodiment, the image processing is performed for correcting the printing timings in accordance with the modified correction data C. Specifically, the image data Di is modified into the print data Dp in accordance with the modified correction data C, and the printing timings of the recording element arrays EL are corrected in accordance with the print data Dp. However, the present invention is not limited to this. That is, the printing timings may be corrected in accordance with the modified correction data C without performing any image processing. For instance, the printing timings of the recording element arrays EL may be moved ahead or behind directly in accordance with the modified correction data C.

(7) In the present embodiment, the inkjet printing apparatus 1 has been described as one example of the printing apparatus. However, the present invention is not necessarily applied to such an inkjet type. For instance, the printing apparatus of the present invention may be a thermal printing apparatus, an electrostatic printing apparatus, an indirect offset inkjet printing apparatus, or a plateless printing apparatus.

(8) In the present embodiment, the web paper WP has been described as one example of the recording medium. However, this is not limitative. For instance, the recording medium may be a film, a printing sheet, strip foil such as a plastic sheet, and the like.

(9) The present embodiment and the modifications in the above (1) to (8) may be variable appropriately by replacing or combining the configuration of the present embodiment or the modifications with the other thereof.

The present invention may be embodied in other specific forms without departing from the spirit or essential attributes thereof and, accordingly, reference should be made to the appended claims, rather than to the foregoing specification, as indicating the scope of the invention.

What is claimed is:

1. A printing method of performing printing onto a recording medium to be transported with a plurality of recording element arrays, the printing method comprising
   a storing step of storing a perimeter of a timing roller upon acquiring correction data in association with the correction data, the correction data being used for correcting printing timings of the recording element arrays;
   an obtaining step of obtaining the perimeter during printing after the storing step of storing the perimeter upon acquiring the correction data; and
   a modifying step of modifying the correction data during the printing in accordance with the perimeter upon acquiring the correction data and the perimeter during the printing, wherein
   the timing roller contacts the recording medium to be transported by a drive roller and rotates in association with transportation of the recording medium, and
   the obtaining step of obtaining the perimeter obtains the perimeter of the timing roller in accordance with the transportation speed of the recording medium and the rotation amount of the timing roller.

2. The printing method according to claim 1, wherein the modifying step of modifying correction data comprises calculating a modification amount in accordance with a difference between the perimeter upon acquiring the correction data and the perimeter during the printing, and adding the correction data to the modification amount.

3. The printing method according to claim 1, further comprising:
   a correcting step of correcting the printing timings in accordance with the modified correction data.

4. The printing method according to claim 3, wherein the correcting step of correcting the printing timing comprises correcting printing positions of the recording element arrays relative to the recording medium in a transportation direction of the recording medium.

5. The printing method according to claim 1, further comprising:
   an acquiring step of acquiring the correction data in accordance with an inspection pattern printed onto the recording medium; and
   an obtaining step of obtaining the perimeter of the timing roller upon printing the inspection pattern onto the recording medium with the recording element arrays as the perimeter upon acquiring the correction data.

6. The printing method according to claim 1, wherein the correction data is set for the recording element arrays individually.

7. The printing method according to claim 1, wherein the recording element arrays are inkjet recording element arrays discharging ink droplets.

8. The printing method according to claim 1, wherein the recording medium is web paper.

9. A printing apparatus, comprising:
   a drive roller rotatably driven to feed a recording medium;
   a timing roller contacting the recording medium to be transported by the drive roller and rotating in association with transportation of the recording medium;
   a perimeter obtaining unit obtaining a perimeter of the timing roller;
   a storing unit storing correction data used for correcting printing timings and the perimeter upon acquiring the correction data in association with each other;
   a correction data modifying unit modifying the correction data associated with the perimeter into modified correction data in accordance with the perimeter during printing and the perimeter stored in the storing unit;
   a plurality of recording element arrays performing printing onto the recording medium to be transported at corrected printing timings corrected with the modified correction data;
   a speed controller controlling a transportation speed of the recording medium to be transported; and
   a rotation amount detector detecting a rotation amount of the timing roller,
   wherein the perimeter obtaining unit obtains the perimeter of the timing roller in accordance with the transportation speed of the recording medium and the rotation amount of the timing roller.

10. The printing apparatus according to claim 9, wherein the speed controller controls a rotation amount of the drive roller, and
    the rotation amount detector is an encoder attached to the timing roller.

11. The printing apparatus according to claim 9, further comprising:
    a printing timing corrector correcting the printing timings with the modified correction data, and causing the recording element arrays to perform printing at corrected printing timings.

12. The printing apparatus according to claim 11, wherein the printing timing corrector corrects the printing timings determined from the rotation amount of the timing roller using the modified correction data.

13. The printing apparatus according to claim 11, wherein the printing timing corrector corrects printing positions of the recording element arrays relative to the recording medium in the transportation direction of the recording medium.

14. The printing apparatus according to claim 9, wherein the correction data is set for the recording element arrays individually.

15. The printing apparatus according to claim 9, wherein the recording element arrays are inkjet recording element arrays discharging ink droplets.

16. The printing method according to claim 9, wherein the recording medium is web paper.

* * * * *